United States Patent [19]

Jackson et al.

[11] Patent Number: 5,063,733
[45] Date of Patent: Nov. 12, 1991

[54] ENGINE COOLING SYSTEM PROTECTION DEVICE

[75] Inventors: Nigel P. Jackson, Melbourne; Geoffrey P. Virr, Hemel Hempstead, both of England

[73] Assignee: Rolls-Royce, plc, London, England

[21] Appl. No.: 577,120

[22] Filed: Sep. 4, 1990

[30] Foreign Application Priority Data

Sep. 13, 1989 [GB] United Kingdom ............... 8920695

[51] Int. Cl.⁵ .......................... F02C 3/04; F04D 29/00
[52] U.S. Cl. .................................................. 60/39.75
[58] Field of Search .............. 60/39.75; 415/115, 116, 415/117; 137/809

[56] References Cited

U.S. PATENT DOCUMENTS 3,751,909 8/1973 Kohler .............................. 415/117

FOREIGN PATENT DOCUMENTS 8707331 12/1987 PCT Int'l Appl. .
2160929 1/1986 United Kingdom .

OTHER PUBLICATIONS

Professional Engineering, Nov. 1988, p. 66, "Simple Solution to Hazard Control".

Primary Examiner—Louis J. Casaregola
Assistant Examiner—Laleh Jalali
Attorney, Agent, or Firm—Oliff & Berridge

[57] ABSTRACT

In an engine cooling system wherein supply pipes 40, 50 supply cooling fluid (e.g.: air) to the turbine 20 from a compressor bleed 10, upon failure of one of the supply pipes 50 the backflow of cooling fluid from the turbine to the point of failure may be stemmed by use of a vortex amplifier 140, 160 connected into each supply pipe 40, 50, the tangential ports of the vortex amplifiers being interconnected by a balance pipe 180. This allows the total minimum bleed flow rate of cooling fluid supplied to the turbine from the compressor bleed to be reduced.

5 Claims, 3 Drawing Sheets

ENGINE COOLING SYSTEM PROTECTION DEVICE

FIELD OF THE INVENTION

This invention relates to the field of engines and to cooling system therefor.

DESCRIPTION OF THE PRIOR ART

In certain known engines, particularly engines comprising a gas turbine driven from a compressor, for example a helicopter engine, the air cooling system comprises two external air pipes supplying cooling air to the turbine from a compressor bleed in the engine. Such a system is shown schematically in FIG. 1(a) of the accompanying drawings. The arrangement has dual supply pipes 40,50 from the compressor 10 to the power turbine 20, in order to maintain a sufficient supply of cooling air to certain critical components at an acceptable operating temperature, even in the event that one of the supply pipes 40,50 should become fractured or severed. In such an event, as shown in FIG. 1(b) of the accompanying drawings, not only is air lost by flow B1 out of the broken pipe 50a directly from the compressor bleed, but there is also a significant loss through the turbine 20 from the intact supply pipe 40 by reverse flow B2 in the broken pipe 50b to the fracture point.

In order to be able to cope with this, the designed total bleed flow rate (A+B, in FIG. 1(a)) from the compressor in a current engine of this type is typically approximately two to three times greater than the minimum bleed flow rate required for cooling purpose alone. As well as being uneconomical this also affects the performance of the engine adversely.

BRIEF SUMMARY OF THE INVENTION

It has now been found that the reverse flow B2 occurring upon supply pipe failure may be considerably reduced or even stopped, thereby allowing less cooling air to be provided to the power turbine air system under normal operating conditions and thus improving engine performance. At its widest, the present invention proposes that the reduction or stopping (hereinafter 'stemming') is powered from another supply pipe. It has been found that this can be achieved without significantly affecting the flow in that other pipe.

Thus, in one aspect the present invention may provide, an engine cooling system wherein cooling fluid is supplied through a plurality of supply pipes to a turbine from a compressor bleed, comprising means connected in each of said supply pipes for stemming backflow of cooling fluid in one supply pipe from said turbine occurring upon failure of said one supply pipe, which means is actuatable automatically, that automatic actuation being arranged to be powered by pressure of fluid in a second, intact supply pipe.

In another aspect the invention may provide a method of stemming backflow of cooling fluid in a supply pipe from a turbine of an engine occurring upon failure of said supply pipe, comprising actuating automatically means connected in said supply pipe to block said backflow, that actuation being powered by pressure of fluid in a second, intact cooling fluid supply pipe.

The said means preferably comprise a vortex amplifier connected into each air pipe leading from the compressor to the power turbine, the vortex amplifiers may then be interconnected at their tangential ports by a balance pipe.

BRIEF DESCRIPTION OF THE DRAWINGS

An embodiment of the invention will now be described, with reference to the accompanying drawings, wherein:-

DETAILED DESCRIPTION

Figure 2A:
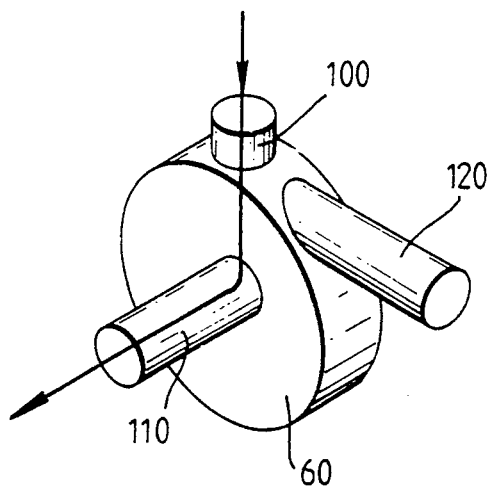
FIGS. 2(a), (b) and (c) are diagrammatic perspective views of a vortex amplifier for use in the embodiment of the invention, showing its three functional modes.

An example of a vortex amplifier for use herein is the type described in Professional Engineering, November 1988, the disclosure of which is incorporated herein by reference. Such a vortex amplifier is shown in FIG. 2, and comprises a main cylindrical chamber 60, which is provided with three ports: a radial port 100, an axial port 110 and a tangential port 120, the orientation and position of these ports in relation to the cylindrical chamber being as their name describes. In normal use the vortex amplifier has three functional modes as depicted in FIGS. 2(a), (b) and (c). The main process flow through the device (into the chamber 60 via the radial port 100 and out of the chamber via the axial port 110) is represented by the thick solid line and the control flow (into the chamber 60 via the tangential port 120 and out of the chamber via the axial port 110) is represented by the thin dotted line.

Figure 2B:
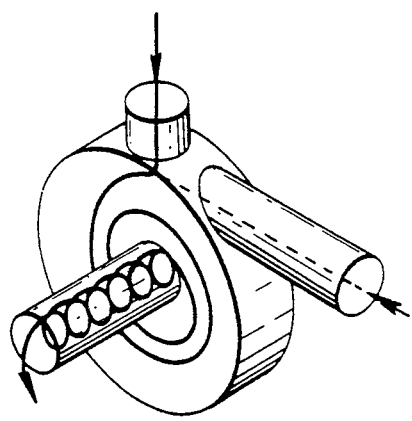
Figure 2C:
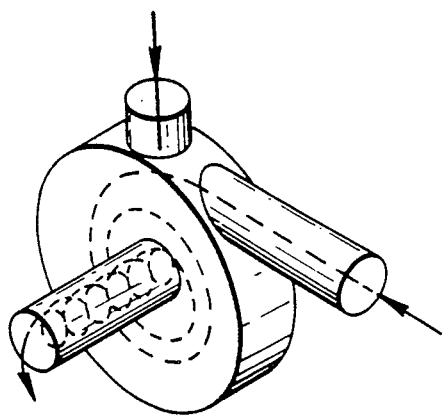

FIG. 2(a) shows the process flow uncontrolled,; the pressure drop through the device is very low and may be ignored for all practical purposes. FIG. 2(b) shows the process flow being modulated by a small control flow; a vortex is set up in the chamber 60 and the process flow is reduced in direct proportion to the control flow applied. FIG. 2(c) shows the control flow at a maximum for the application and the vortex set up is so powerful that the process flow is completely cut off.

Figure 3:
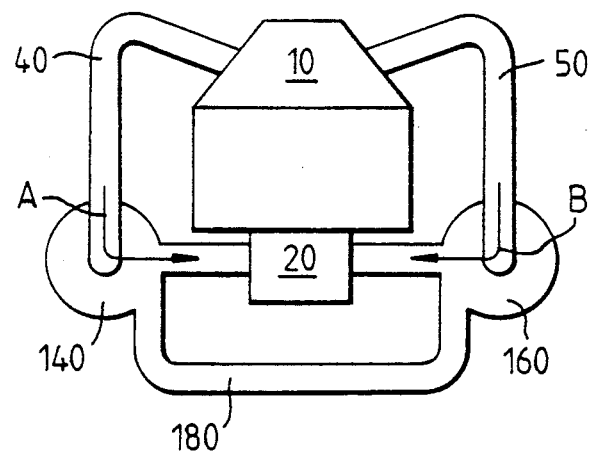
FIG. 3 is a schematic view of a system in accordance with one embodiment, showing the normal flow situation with the supply pipes intact.

Referring to FIG. 3, as used in this embodiment of the invention, each vortex amplifier 140,160 is connected into an air supply pipe 40,50 leading from a bleed in the compressor 10 to the power turbine 20, the supply pipes from the compressor being connected to the axial ports 110 and the radial ports 100 leading to the power turbine. The tangential ports 120 of the two vortex amplifiers are interconnected via a balance pipe 180. Thus, under normal operating conditions the two vortex amplifiers are used in the opposite sense to that shown in FIG. 2, ie the process flow enters each device via its axial port and leaves it via its radial port.

Figure 4:
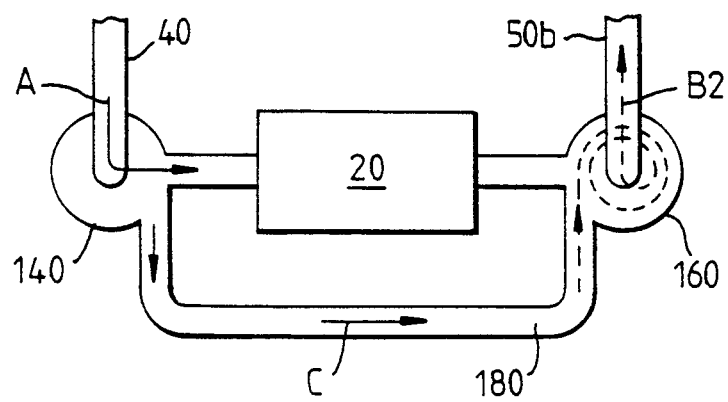
FIG. 4 is a schematic view of the lower part of the system of FIG. 3, showing the one pipe failure flow situation.

With both air pipes from the compressor intact, the pressure inside the chambers of the two vortex amplifiers will be equal, sc there will be no flow between them through the balance pipe 180. This condition is shown in FIG. 3. In the event of one of the air pipes 40,50 from the compressor being severed or fractured, as shown in FIG. 4, the vortex amplifier associated with that pipe will experience a sudden drop in pressure in the chamber, the resulting inbalance in pressure between the two ends of the balance pipe resulting in a flow of air C through the balance pipe from the other vortex amplifier. Thus, this flow of air C into the chamber of the affected vortex amplifier 160 via its tangential port acts as a control flow and, via the mechanism described above, "switches off" the process flow of air through that vortex amplifier from the turbine 20. The reverse flow B2 out of the fractured pipe is thus stemmed and may be stopped altogether. This enables the total minimum bleed flow which the power turbine air supply must be capable of providing to be reduced significantly.

In one example of this embodiment, in a power turbine cooling system of a gas turbine engine the two vortex amplifiers may be mounted adjacent the power turbine supply inlet ports. The vortex amplifiers may be formed in a single metal block, for example by machining or casting, which may be bolted directly onto the engine casing. The cooling air inlets of the power turbine may be positioned directly beneath the vortex amplifier blocks and register with the radial ports thereof.

Figure 1A:
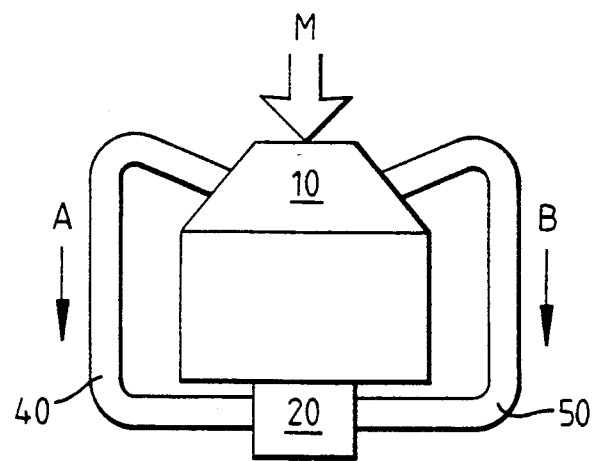
FIG. 1(a) is a schematic view of a known system showing the normal flow situation with the supply pipe intact.

By way of illustration only, the improvement obtainable by the use of a system in accordance with the embodiment of the invention in a gas turbine engine may be demonstrated as follows:

In FIG. 1(a), the normal flow situation with both supply pipes intact, the two external air supply pipes 40,50 each supply a bleed flow rate of approximately 1.2% of the total compressor flow (M) which is fed directly to the power turbine, the two supply pipes 40,50 together supplying a total cooling air flow rate of about 2.4% M.

Figure 1B:
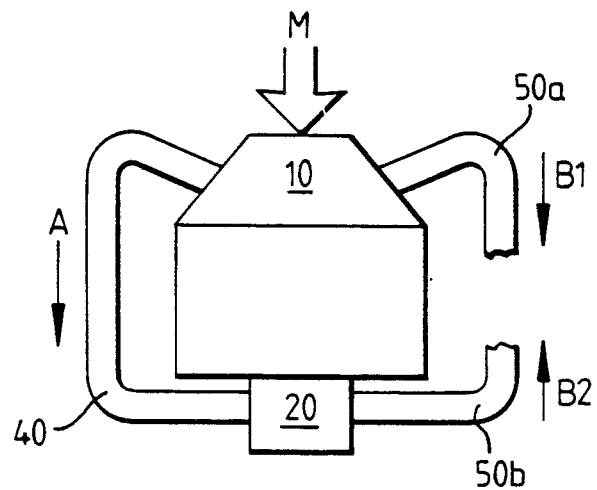
FIG. 1(b) is a schematic view of the system of FIG. 1(a), showing the one pipe failure flow situation.

In the one pipe failure flow situation shown in FIG. 1(b), a typical reverse flow rate through pipe 50b from the turbine 20 is in the region of 0.6% M, while the bleed flow rate through pipes 40 and 50a are generally of the order of 1.6% M and 2.0% M, respectively. Thus, the "useful" flow rate from the compressor 10 to the turbine 20 is reduced from the normal 2.4% M to around 1.0% M, which is the required minimum bleed flow rate for providing adequate cooling.

In a typical vortex amplifier of the type described herein, in order to fully shut off the process flow through the device a control flow of approximately 5-10% of the process flow is required. This may be achieved by appropriate design of the balance pipe system and allows the intact pipe ie pipe 40 in FIGS. 3 and 4, to need only a flow approximately 1% M for maintaining the required minimum for adequate cooling in the event of pipe 50 being severed. Thus, the overall total bleed flow of pipes 40 and 50 together in the system may be reduced to approximately 1.4% M, which gives a reduction of 1% M overall, or a 58% saving in FIG. 3 compared to FIG. 1(a).

In the system according to the invention if the balance pipe were to become detached while the engine was in normal use, this should not endanger the integrity of the power turbine discs, because the leakage flow from the balance pipe would be relatively small.

Although this invention has been described with reference to gas turbine cooling systems, it is not limited to this field and may be useful in other fields where a similar control system is necessary or desirable.

We claim:

1. An engine cooling system for supplying a flow of cooling fluid from a source to a turbine in a flow direction, comprising:
   a plurality of supply pipes for carrying the flow of cooling fluid between the source and the turbine;
   a corresponding plurality of stemming means for stemming backflow of cooling fluid to inhibit a backflow of cooling fluid in a supply pipe in a direction opposite to the flow direction, each stemming means including a first port connected to a corresponding supply pipe of said plurality of supply pipes, a second port connected to said turbine, and a flow control port connected to a corresponding flow control of an adjacent one of the corresponding plurality of stemming means;
   each means for stemming backflow being responsive to pressure of the flow of cooling fluid in the plurality of supply pipes to prevent backflow in its corresponding supply pipe upon flow of fluid into said control port and permit the flow of cooling fluid from said first port to said second port in the flow direction when there is no flow of fluid into said control port.

2. An engine cooling system according to claim 1, wherein the means for stemming backflow is a vortex amplifier.

3. An engine cooling system according to claim 2, wherein said vortex amplifier comprises a chamber and radial, axial and tangential ports.

4. An engine cooling system according to claim 3, wherein the tangential ports of the vortex amplifiers are interconnected by a balance pipe.

5. An engine cooling system according to any of claims 1 to 4, wherein the turbine is a gas turbine and the cooling fluid is air.

* * * * *